US009519868B2

(12) United States Patent
Criminisi et al.

(10) Patent No.: US 9,519,868 B2
(45) Date of Patent: Dec. 13, 2016

(54) SEMI-SUPERVISED RANDOM DECISION FORESTS FOR MACHINE LEARNING USING MAHALANOBIS DISTANCE TO IDENTIFY GEODESIC PATHS

(75) Inventors: Antonio Criminisi, Cambridge (GB); Jamie Daniel Joseph Shotton, Cambridge (GB)

(73) Assignee: Microsoft Technology Licensing, LLC, Redmond, VA (US)

( * ) Notice: Subject to any disclaimer, the term of this patent is extended or adjusted under 35 U.S.C. 154(b) by 267 days.

(21) Appl. No.: 13/528,876

(22) Filed: Jun. 21, 2012

(65) Prior Publication Data

US 2013/0346346 A1    Dec. 26, 2013

(51) Int. Cl.
*G06N 99/00* (2010.01)
*G06N 7/00* (2006.01)
*G06N 5/02* (2006.01)

(52) U.S. Cl.
CPC ............ *G06N 99/005* (2013.01); *G06N 7/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,930,392 A | 7/1999 | Ho | |
| 6,226,409 B1 | 5/2001 | Cham et al. | |
| 8,527,432 B1* | 9/2013 | Guo et al. | 706/12 |
| 8,676,803 B1* | 3/2014 | Leung et al. | 707/737 |
| 2005/0286865 A1* | 12/2005 | Dorai et al. | 386/69 |
| 2006/0093208 A1* | 5/2006 | Li et al. | 382/159 |
| 2007/0265991 A1* | 11/2007 | Collobert et al. | 706/16 |
| 2010/0169250 A1 | 7/2010 | Schmidtler et al. | |
| 2010/0205123 A1 | 8/2010 | Sculley et al. | |
| 2010/0232686 A1* | 9/2010 | Dewan et al. | 382/159 |

(Continued)

OTHER PUBLICATIONS

"Semi-Supervised Random Forests", Leistner, C., Saffari, A., Santner, J., Bischof, H., IEEE 12th International Conference on Computer Vision (ICCV), Sep. 29, 2009-Oct. 2, 2009, pp. 506-513.*

(Continued)

*Primary Examiner* — Kakali Chaki
*Assistant Examiner* — Mai T Tran
(74) *Attorney, Agent, or Firm* — Tom Wong; Micky Minhas; Zete Law, P.L.L.C.

(57) ABSTRACT

Semi-supervised random decision forests for machine learning are described, for example, for interactive image segmentation, medical image analysis, and many other applications. In examples, a random decision forest comprising a plurality of hierarchical data structures is trained using both unlabeled and labeled observations. In examples, a training objective is used which seeks to cluster the observations based on the labels and similarity of the observations. In an example, a transducer assigns labels to the unlabeled observations on the basis of the clusters and certainty information. In an example, an inducer forms a generic clustering function by counting examples of class labels at leaves of the trees in the forest. In an example, an active learning module identifies regions in a feature space from which the observations are drawn using the clusters and certainty information; new observations from the identified regions are used to train the random decision forest.

20 Claims, 8 Drawing Sheets

(56) References Cited

U.S. PATENT DOCUMENTS

2011/0246409 A1    10/2011  Mitra
2012/0143797 A1*   6/2012   Wang et al. .................. 706/12

OTHER PUBLICATIONS

"A Semi-supervised Document Clustering Algorithm based on EM", Rigutini, L., Maggini, M., Proceedings of the 2005 IEEE/WIC/ACM International Conference on Web Intelligence, Sep. 19-22, 2005, pp. 200-206.*

"Induction of Decision Trees", Quinlan, J. R., Machine Learning, 1986, vol. 1, Issue 1, pp. 81-106.*

"Semi-supervised Relation Extraction with Large-scale Word Clustering", Sun, A., Grishman, R., Sekine, S., Proceedings of the 49th Annual Meeting of the Association for Computational Linguistics: Human Language Technologies—vol. 1, Jun. 19-24, 2011, pp. 521-529.*

"Semi-supervised classification by low density separation", Chapelle, O., & Zien, A. In Proceedings of the tenth international workshop on artificial intelligence and statistics, Jan. 2005, vol. 1, pp. 57-64.*

"Learning a Mahalanobis distance metric for data clustering and classification", Shiming Xiang, Feiping Nie, and Changshui Zhang. Pattern Recognition vol. 41, Issue 12, Dec. 2008, pp. 3600-3612.*

Zhou, et al., "Semi-Supervised Learning by Disagreement", In Journal of Knowledge and Information Systems, vol. 24 Issue 3, 2009, pp. 415-439.

Roli, Fabio, "Semi-Supervised Multiple Classifier Systems: Background and Research Directions", In Proceedings of Multiple Classifier Systems, Springer Verlag, vol. 3541, 2005, pp. 1-11.

Hoi, et al., "A Semi-Supervised Active Learning Framework for Image", Retrieval in Proceedings of IEEE Computer Society Conference on Computer Vision and Pattern Recognition, vol. 2, Jun. 20-25, 2005, pp. 302-309.

Zheng, et al., "Fast Automatic Heart Chamber Segmentation from 3D CT Data Using Marginal Space Learning and Steerable Features", in Proc. Int'l Conf. Computer Vision, 2007. 8 Pages.

Zheng, et al., "Four-Chamber Heart Modeling and Automatic Segmentation for 3D Cardiac CT Volumes Using Marginal Space Learning and Steerable Features", IEEE Trans. Medical Imaging, vol. 27, No. 11, pp. 1668-1681, 2008.

New US Patent Application entitled "Density Estimation and/or Manifold Learning" U.S. Appl. No. 13/528,866, filed together with the present application on Jun. 21, 2012 and assigned to Microsoft Corporation. 38 Pages.

Martinez, Dominique, "Neural Tree Density Estimation for Novelty Detection", In Proceedings of IEEE Transactions on Neural Networks, vol. 9, No. 2, Mar. 1998, pp. 330-338.

Yeung, et al., "Parzen-window Network Intrusion Detectors", In Proceedings of Sixteenth International Conference on Pattern Recognition, vol. 4, Sep. 2002, pp. 385-388.

Burkholder, Joshua Jeremy, "Nearest Neighbor Classification Using a Density Sensitive Distance Measurement", In thesis of Nearest Neighbor Classification using a Density Sensitive Distance Measurement, Sep. 2009, 120 pages.

Criminisi, et al., "Decision forests for classification, regression, density estimation, manifold learning and semi-supervised learning" MSR-TR-2011-114, Oct. 28, 2011, 151 pages.

Criminisi, et al., "Decision Forests: A Unified Framework for Classification, Regression, Density Estimation, Manifold Learning and Semi-Supervised Learning". Foundations and Trends in Computer Graphics and Vision: vol. 7: No. 2-3, pp. 81-227, 2011, 150 pages.

\* cited by examiner

SEMI-SUPERVISED RANDOM DECISION FORESTS FOR MACHINE LEARNING USING MAHALANOBIS DISTANCE TO IDENTIFY GEODESIC PATHS

BACKGROUND

Random decision forests are ensembles of tree data structures which may be used for a variety of machine learning tasks. For example, classification tasks, prediction tasks involving regression problems, and detecting abnormalities. Random decision forest technology is useful in many application domains such as gesture recognition for natural user interfaces, computer vision, robotics, medical image analysis and others.

A decision forest is a plurality of decision trees each having a root node, a plurality of split nodes and a plurality of leaf nodes. Associated with each leaf node is data accumulated during a training phase when the decision forest is trained. During training the structure of the trees is learnt and tests are selected (from randomly generated tests in the case of random decision forests) for use at the split nodes. The data at the leaf nodes may be aggregated. For example, it may be represented using a probability distribution.

The embodiments described below are not limited to implementations which solve any or all of the disadvantages of known machine learning systems which use random decision forests.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Semi-supervised random decision forests for machine learning are described, for example, for interactive image segmentation, medical image analysis, and many other applications. In examples, a random decision forest comprising a plurality of hierarchical data structures is trained using both unlabeled and labeled observations. In examples, a training objective is used which seeks to cluster the observations based on the labels and similarity of the observations. In an example, a transducer assigns labels to the unlabeled observations on the basis of the clusters and confidence information. In an example, an inducer forms a generic classification function by counting examples of class labels at leaves of the trees in the forest. In an example, an active learning module identifies regions in a feature space from which the observations are drawn using the clusters and confidence information; new observations from the identified regions are used to train the random decision forest.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image processing system, the system described is provided as an example and not a limitation. As those skilled in the art will appreciate, the present examples are suitable for application in a variety of different types of machine learning systems.

Figure 1:
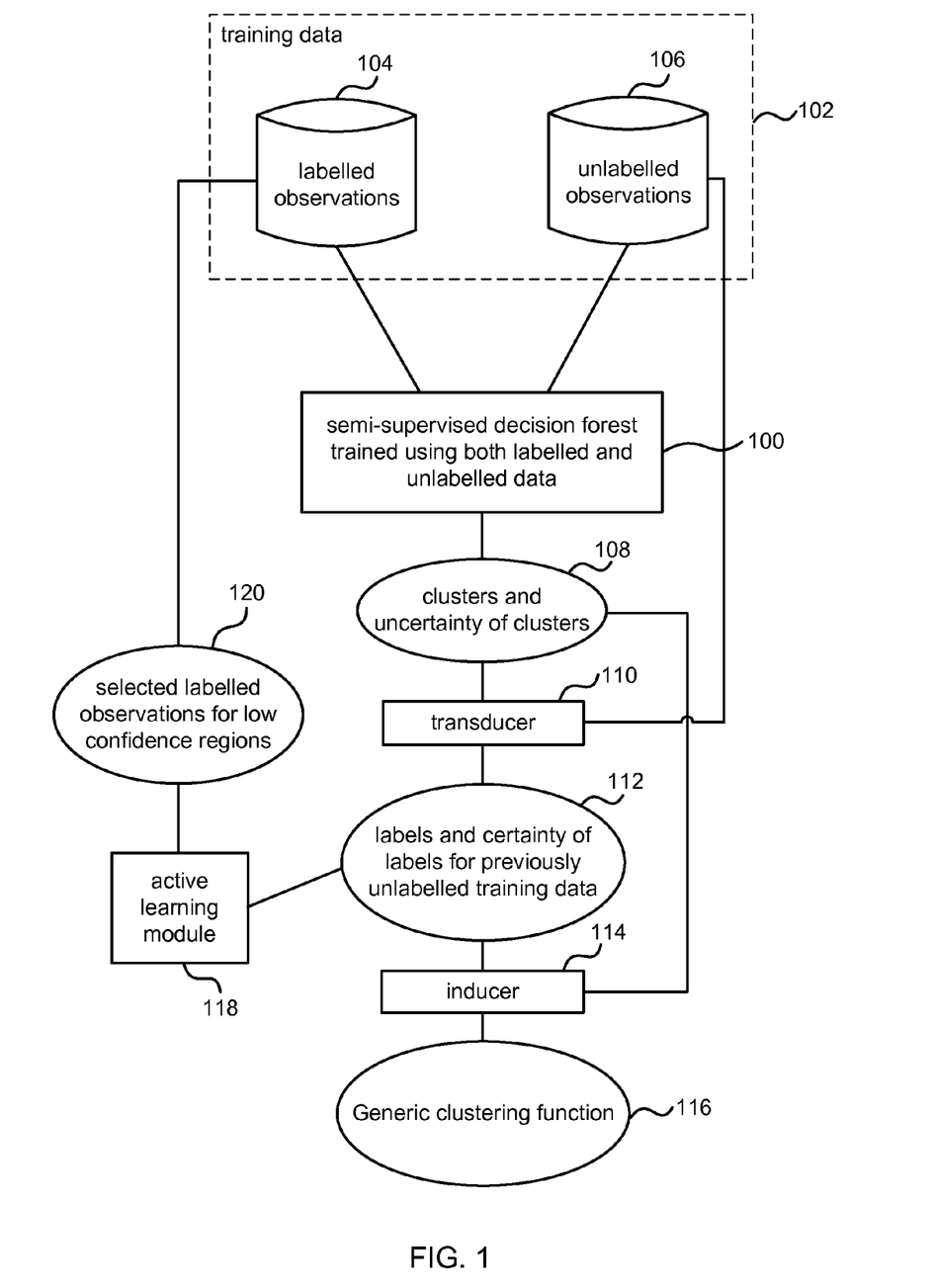
FIG. 1 is a schematic diagram of a machine learning system comprising a semi-supervised random decision forest.

FIG. 1 is a schematic diagram of a machine learning system comprising a semi-supervised random decision forest 100. A random decision forest is semi-supervised where it is trained using both labeled observations 104 and unlabeled observations 106. For example, interactive image segmentation may be carried out using a semi-supervised random decision forest. Interactive image segmentation typically involves a user making one or more brush strokes on a foreground and/or background region of an image. The image elements identified by the brush strokes are labeled training data and the remaining image elements are unlabeled training data. A semi-supervised random decision forest may be trained using the labeled and the unlabeled training data (also referred to as labeled and unlabeled observations). A transducer 110 and an inducer 114 may be used together with the trained semi-supervised random decision forest 100 to obtain solutions to the image segmentation together with confidence information associated with those solutions. In another example, a random decision forest is trained using both labeled and unlabeled medical images in order to automatically detect body organs. Labeled training data has available ground truth information such as the knowledge of whether an image element is foreground or background. This may be provided by human experts, may be machine generated or may be provided by other processes. Labeled training data is typically difficult and/or expensive to obtain as compared with unlabeled training data. By using a semi-supervised random decision forest it is possible to exploit both labeled and unlabeled training data.

The random decision forest 100 is implemented using a computer as is the transducer 110 and the inducer 114 and these entities may be integral with one another or may be separate as indicated in FIG. 1. A random decision forest is a plurality of random decision trees each having a root node, a plurality of split nodes and a plurality of leaf nodes. The root nodes, leaf nodes and split nodes may be represented using data structures in memory and/or as computer implemented instructions. For example, instructions implementing the functionality of the semi-supervised random decision forest may be provided as software which may be compiled. Associated with each leaf node is data accumulated during a training phase when the forest is trained with both labeled observations 104 and unlabeled observations 106. During training the structure of the trees is learnt. The data at the leaf nodes may be aggregated. For example, it may be represented using a probability distribution. Aggregating the probability distributions associated with leaves of each tree forms a forest density which is an estimate of an unknown probability density function from which the training data is generated.

Unlabeled observations 106 are stored at a database or are accessible from another source. The nature of the unlabeled observations depends on the application domain. For example, the unlabeled observations 106 may be digital images in the case of an image processing application. Digital images include two and higher dimensional images such as medical volumes, depth images, videos and other types of images. Other examples of unlabeled observations are, text documents, audio files, videos, sensor readings, or any other empirical data observed from an entity or environment which may be natural or automated. The observations are unlabeled in the sense that there is no ground truth data available for the observations. For example, in the case of images of landscapes it is not known what classes of landscape the individual images belong to (such as cityscape, seascape, country scene). In a medical image example it is not known what body organs are depicted in the individual medical images.

Labeled observations 104 are stored at a database or are accessible from another source. The labeled observations are typically of the same type as the unlabeled observations except that ground truth data are available. The ground truth data may be obtained from human judges or automated processes.

Both the labeled and the unlabeled observations 104, 106 are assumed to be generated by an unknown process and to be distributed according to an unknown probability density function. The semi-supervised decision forest 100 seeks to assign labels to all unlabeled points. This is achieved by training the forest 100 using both the labeled observations 104 and the unlabeled observations 106.

Data stored at a leaf of each tree in the forest may be combined to form a forest density. The data stored at each leaf may be used to calculate a domain bounded probability distribution so that the forest density sums to 1 (as a probability density function is non-negative and its integral over the range of values of the continuous variable is 1).

Each tree in the forest acts to cluster the labeled and the unlabeled observations and to produce certainties of those clusters. Each tree is trained independently and so the clusters of each tree are different. Thus the semi-supervised decision forest 100 of FIG. 1 is shown as producing clusters 108 and uncertainty of those clusters. Within the clusters some of the data is labeled since some of the observations are labeled 104. A transducer 110 may be used to generate labels 112 for the previously unlabeled training data and also to produce confidences for those labels. The transducer may use the clusters produced by the decision forest 100 to guide the process of labeling the previously unlabeled training data as described in more detail below. The generated labels 112 may then be used by an active learning module 118. For example, in a medical image application, the labels and uncertainty information generated by the transducer may be used to identify low confidence regions in the observed data space. More observations (labeled or unlabeled) may then be selected 120 in these regions and used to train the semi-supervised decision forest.

The active learning module 118 may identify low confidence regions in the observed data space by finding regions in that space which have few observations and/or which have observations with low confidences. Once the low confidence regions are identified, new observations in those low confidence regions are obtained. For example, by instructing an automated system to capture sensor data within particular parameter ranges or in specified environmental conditions. The new observations may then be used to train the semi-supervised decision forest to produce a trained system which is able to cope with a wider range of observations at higher confidence levels.

An inducer 114 may take the class labels generated by the transducer and apply those to the clusters produced by the semi-supervised decision forest in order to find a generic function 116 for classifying test observations not previously seen by the random decision forest.

The semi-supervised forest provides a relatively simple and effective way of analyzing complex data such as images which gives accurate, useful results. By using an ensemble (plurality) of trees in the forest the ability of the system to generalize is improved. Generalization is the ability to deal well with new examples which differ from training data. The component trees in a semi-supervised forest are randomly different from one another and this leads to de-correlation between individual tree predictions.

Alternatively, or in addition, the functionality of the semi-supervised random decision forest, the transducer and the inducer may be performed, at least in part, by one or more hardware logic components. For example, and without limitation, illustrative types of hardware logic components that can be used include Field-programmable gate arrays (FPGAs), Program-specific Integrated Circuits (ASICs), Program-specific Standard Products (ASSPs), system-on-a-chip systems (SOCs), Complex Programmable Logic Devices (CPLDs), and Graphics Processing Units (GPUs).

Figure 2:
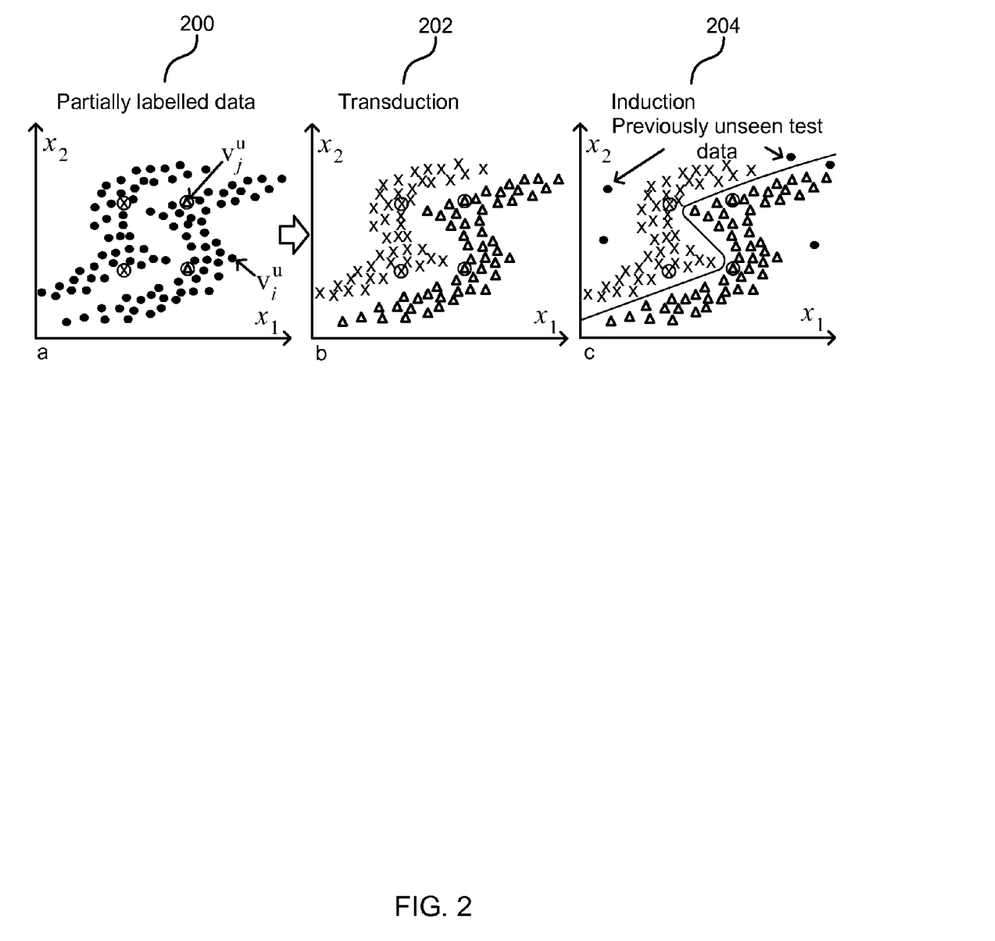
FIG. 2 is an example of data input to a semi-supervised random decision forest and how that data may be labeled using a transducer and an inducer.

FIG. 2 is an example of data input to a semi-supervised random decision forest and how that data may be labeled using a transducer and an inducer. Input data points in a two-dimensional features space are illustrated at graph 200. Unlabeled data points are depicted using black dots and two ground truth labeled data points of class A are depicted using Xs and two ground truth labeled data points of class B are depicted using triangles. A semi-supervised random decision forest may be trained using both the unlabeled and the labeled data so as to cluster the data into two clusters depicted by the S shaped groups of data visible in the figure. A transducer may be used to propagate the ground truth labels to the many unlabeled data points as illustrated in graph 202. The unlabeled data points which were previously shown using black dots are now either Xs or triangles according to which label has been assigned. An inducer may be used to learn a generic function that may be applied to previously unseen test points (black blobs in graph 204) in order to label those test points. Training a conventional classifier on the labeled data only would produce a suboptimal classification surface, i.e. a vertical line in this example.

Figure 3:
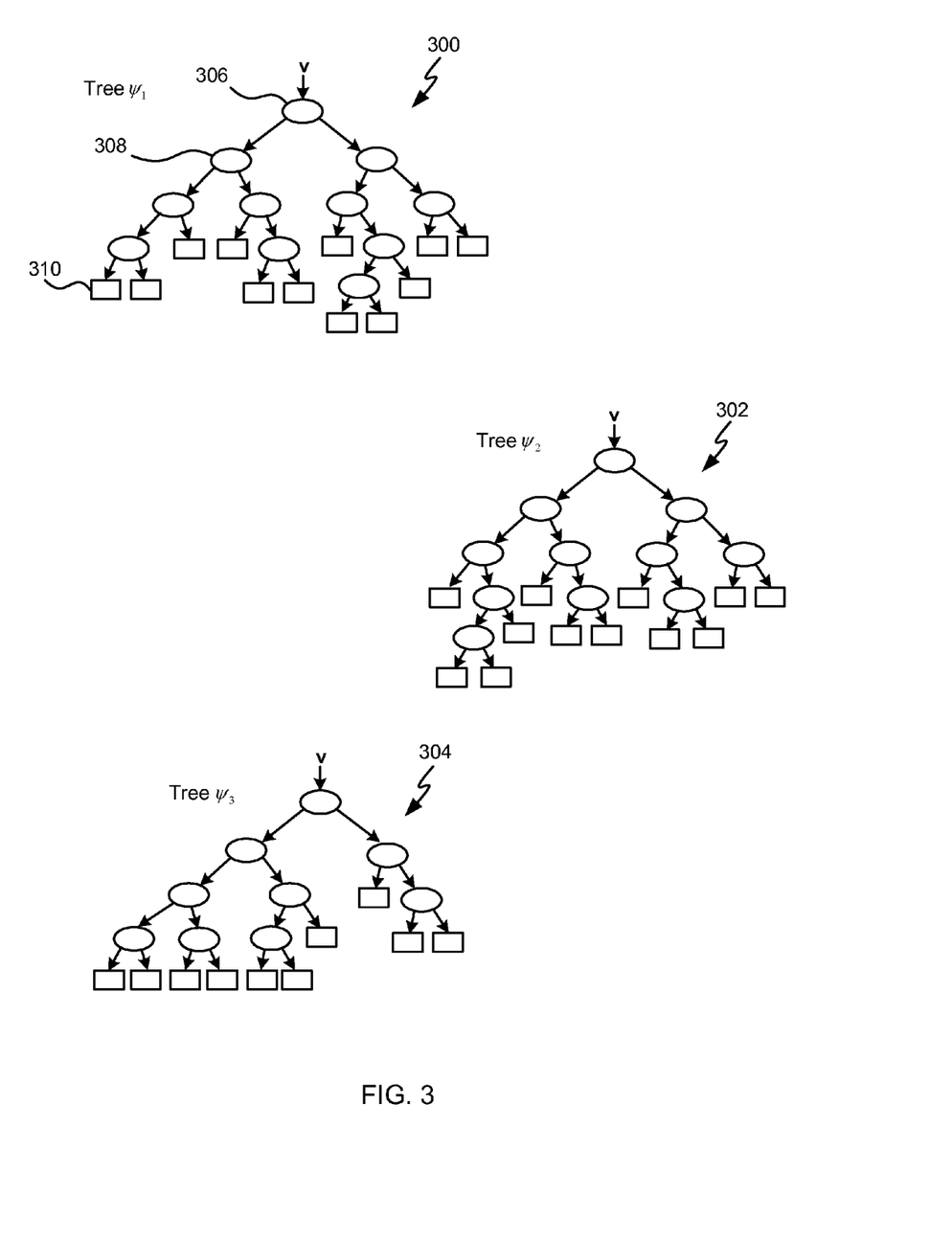
FIG. 3 is a schematic diagram of a random decision forest.

FIG. 3 is a schematic diagram of a random decision forest (suitable for use as a semi-supervised random decision forest) comprising three random decision trees 300, 302, 304. Two or more trees may be used; three are shown in this example for clarity. Each tree is a data structure comprising a plurality of nodes and edges organized in a hierarchical fashion. Nodes are divided into internal (or split) nodes and terminal (or leaf) nodes. In FIG. 3 the internal nodes and the root nodes are represented using ovals and the terminal nodes are represented using rectangles. All the nodes have one incoming edge and there are no loops. In the example in FIG. 3 the trees are binary in that each internal node has two outgoing edges. However, this is not essential; trees may be used where the internal nodes have one or more outgoing edge.

The trees 300, 302, 304 are decision trees in that each internal node has an associated test. For a given input object (such as part of an image or text document or other item) a decision tree estimates an unknown property of the object by asking successive questions (or making tests) about its known properties. Which question to ask next depends on the answer of the previous question and this relationship is represented graphically as a path through the tree which the object follows. The decision is then made based on the terminal node on the path (which has associated stored data).

In the examples described herein random decision forests are trained using both unlabeled data and labeled data. During training the structure of the trees, the tests at the internal nodes and the data stored at the leaf nodes may be learnt. The structure of a tree is the number and arrangement of the internal nodes. Training is often time consuming and computationally expensive.

Using both unlabeled and labeled data for training means that a training function that works for both types of data needs to be designed. This is achieved as described in more detail below by choosing the split node according to a mixed information gain, where the mixed information gain is a function of both the density of all the training data (labeled and unlabeled) and the discrete class entropy of only the labeled training data.

In an example, a plurality of labeled observations are accessed, each labeled observation having a label indicating one of a plurality of classes that the labeled observation is a member of; a plurality of unlabeled observations are also accessed. These are unlabeled in that, for each unlabeled observation, it is not known to which one of the plurality of classes the unlabeled observation belongs. A plurality of random decision trees are trained to form a semi-supervised random decision forest using both the labeled observations and the unlabeled observations such that each random decision tree partitions the labeled and the unlabeled observations into clusters according both to similarity of the observations and according to the associated labels (when available).

Figure 4:
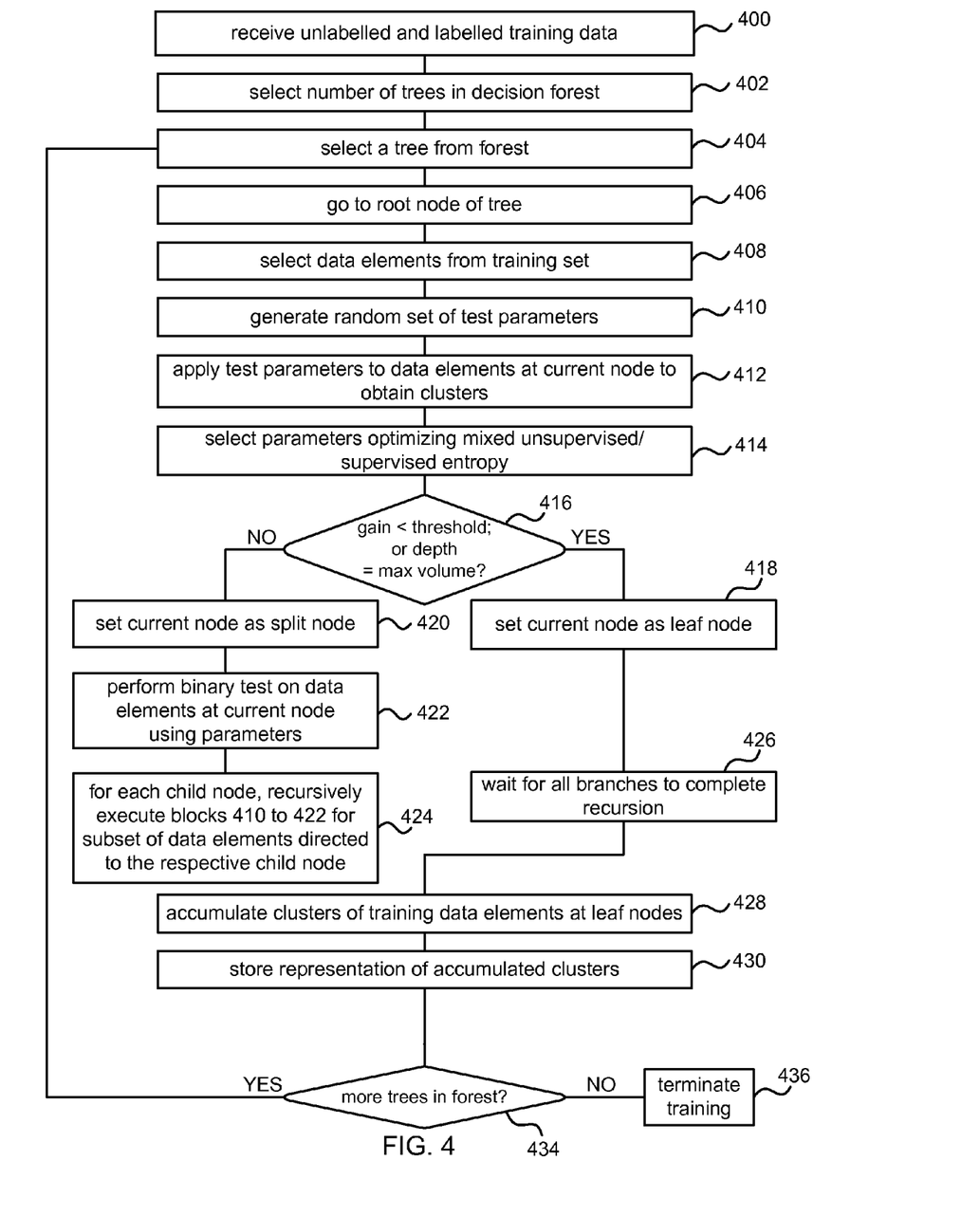
FIG. 4 is a flow diagram of a method of training a semi-supervised random decision forest.

FIG. 4 is a flow diagram of a method of training a semi-supervised forest. Each individual tree in the forest may be trained independently and this training may take place in parallel. The example in FIG. 4 shows the training of each tree in series for clarity.

Unlabeled training data is received 400 and a number of trees for the decision forest is selected 402. The number of trees may be preconfigured by an operator for example. The choice of the number of trees to use depends on the application domain. In general, larger forests give higher accuracy at the expense of increased storage and computation requirements.

A tree from the forest is selected 404 and the process moves 406 to the root node of that tree. Data elements are selected 406 from the training set. For example, where the training set comprises images the data elements may be image elements of an image. A random set of test parameters 410 are generated for one or more split functions to be used at a split node. The split functions and parameter combinations are applied 412 to the data elements. This acts to cluster the data elements. The split function and parameter values which provided an optimal "split" of the training data are selected 414 and stored at the split node. In order to select an optimal "split" a training objective function is used which is suitable for use with a mix of labeled and unlabeled training data. For example, this may be to optimize a mixed information gain that relates to density of all the observations (both labeled and unlabeled) and to an entropy of the labeled observations alone; a detailed example is given later in this document.

The training process may then decide whether the current node is to be set as a leaf node or not. This decision 416 may be made based on an amount of information gain at step 414. If that gain is less than a threshold then the node may be set as a leaf node 418. If the depth of the tree is at a threshold then the node may also be set as a leaf node. Otherwise the node is set as a split node 420.

Once the current node is set as a split node the split function and parameters selected at step 414 are applied to the training data elements to give a binary test 422. The process then recursively executes 424 blocks 410 to 422 for each subset of the training data elements directed to the respective child node.

When all branches of the tree have completed 426 the recursion, clusters of training elements are accumulated 428 at the leaf nodes. The training elements may be stored individually or a compact representation of the accumulated training elements may be stored 430 at each leaf. For example, a probability distribution representing the training elements accumulated at a leaf may be stored. If there are more trees in the forest the process repeats 434; otherwise training terminates 436.

As mentioned above a training objective function is used to train a semi-supervised random decision forest which comprises a plurality of randomly trained trees.

The training objective function (given by the mixed information gain) seeks to encourage both separation of differently labeled training data as well as separating different high density regions from one another. For example, a mixed information gain (represented by $I_j$ for the jth split node) is used comprising the sum of a supervised term $I_j^s$ that depends only on the labeled training data and an unsupervised term $I_j^u$ which depends on all data, both labeled and unlabeled. A scalar parameter $\alpha$ is user defined and specifies the relative weight between the two terms.

$$I_j = I_j^u + \alpha I_j^s$$

The supervised term $I_j^s$ may be calculated as:

$$I_j^s = H(\ell_j) - \sum_{i \in \{L,R\}} \frac{|\ell_j^i|}{|\ell_j|} H(\ell_j^i)$$

Which may be expressed in words as: the entropy H of the set of labeled training points $l_j$ that reach the jth split node minus the sum of the entropy of the sets of labeled training points $l^l_i$ that reach each of the child nodes of the jth split node weighted by the ratio of the sizes of the child sets with respect to the size of the parent set. The entropy H of a set of labeled training points may be calculated as $$H(l) = -\Sigma_c p(c) \log p(c)$$

Where c is a ground truth class label of a training point. Expressed in words, the entropy H of a set of labeled training points may be calculated as the negative of the sum over possible ground truth label values of an empirical probability distribution p(c) extracted from the training points times the log of the empirical probability distribution The unsupervised gain term may be calculated as:

A working assumption that clusters of training data at the split nodes may be described using multi-variate Gaussian probability distributions may be made. In that case, the unsupervised information gain $I^u_j$ may be calculated as:

$$I^u_j = \log|\Lambda(\ell_j)| - \sum_{i \in \{L,R\}} \frac{|\ell^i_j|}{|\ell_j|} \log|\Lambda(\ell^i_j)|$$

Which can be expressed in words as: the information gain at the jth split node may be calculated as the log of: the determinant of a covariance matrix of a Gaussian distribution (represented by symbol $\Lambda$) computed for the set of unlabeled training points that have reached the jth split node (represented by symbol $l_j$) minus the sum over the children of the jth split node (represented by j) of the size of the unlabeled training data points that reach the children of the jth split node divided by the size of the unlabeled training data points that reach the jth split node multiplied by the log of the covariance matrix $\Lambda$ computed for the unlabeled training data points that reach the children of the jth split node.

As mentioned above the transducer is arranged to carry out label propagation. For example, this is achieved by implementing the following minimization $$c(v^u) \Leftarrow c\left(\arg\min_{v^l \in L} D(v^u, v^l)\right) \forall\, v^u \in U$$

Here the symbol c represents a function that indicates the class index (label) associated with a point (known in advance only for labeled training points). The minimization enables unlabeled points $V^u$ to take on the labels of geodesically close labeled points $n^l$ whilst seeking to reduce the geodesic distances between each unlabeled point and the labeled point that it takes its label from. The symbol U represents the set of all the unlabeled observations. The term $$\arg\min_{v^l \in L} D(v^u, v^l)$$

indicates the minimal geodesic distance D is sought between an unlabeled point and all the labeled points and the solution is global as indicated by the symbols $\forall v^u \in U$. A generic geodesic distance D is defined as $$D(v^u, v^l) = \min_{\Gamma \in \{\Gamma\}} \sum_{i=0}^{L(\Gamma)-1} d(s_i, s_{i+1})$$

With $\Gamma$ a geodesic path (here represented as a discrete collection of points), $L(\Gamma)$ its length, $\{\Gamma\}$ the set of all possible geodesic paths and the initial and end points $S_0 = V^u$, $S_n = v^l$ respectively. That is, a geodesic distance D between a labeled and an unlabeled point is lowest sum of local distances along a geodesic path between the labeled and the unlabeled point. The geodesic path may be calculated using the distances between points in the clusters. For example, two points may be given a distance of zero if they belong to the same cluster or infinity if not. The local distances may be defined as symmetric Mahalanobis distances $$d(s_i, s_j) = \frac{1}{2}(d_{ij}^T \Lambda_{l(v_i)}^{-1} d_{ij} + d_{ij}^T \Lambda_{l(v_j)}^{-1} d_{ij})$$

With $d_{ij} = S_i - S_j$ and where $\Lambda_{l(v_i)}$ is the covariance associated with the leaf reached by the point $v_i$. Using Mahalanobis local distances as opposed to Euclidean ones discourages geodesic paths from cutting across regions of low data density. A Mahalanobis distance is a scale-invariant distance measure based on correlations between variables which gauges similarity of an unknown sample set to a known one. It is not essential to use Mahalanobis local distances. Other distance measures may be used.

The labels produced by the transducer are different for each tree. When considering the whole forest this yields uncertainty in the newly obtained labels. This gives a probabilistic transductive output. For example, each datum is a member of only a single cluster in a given tree. The geodesic distance may be arranged to exploit cross-tree clusters in order to give geodesic distances for long range propagation.

As mentioned above the inducer is arranged to infer a general probabilistic classification rule p(c|y) that may be applied to previously unseen test input. The rule may be expressed in words as the probability of label value c given unlabeled test input point v. The examples of each class (label type) arriving at each leaf in a tree of the semi-supervised random decision forest defines the tree posterior probability (the probability associated with a given tree that the class label will be a specified value given a particular input point). The probability associated with the whole forest (that the class label will be a specified value given a particular input point) is obtained by aggregating the tree posterior probabilities such as by taking their average. This process is extremely efficient as it involves counting the examples of each class reaching each leaf and does not require training a whole new classifier.

Figure 5:
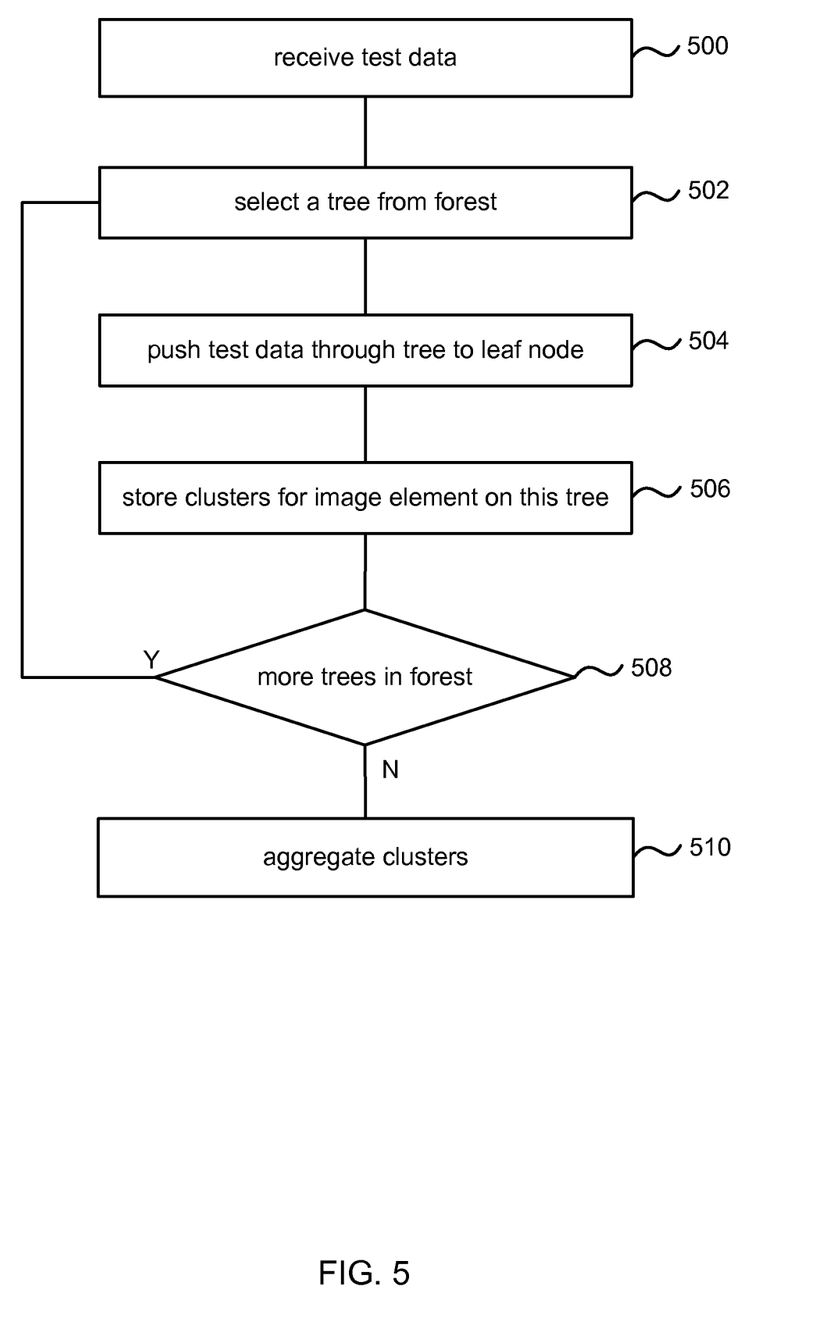
FIG. 5 is a flow diagram of a method of using a trained semi-supervised random decision forest.

With reference to FIG. 5 an unseen test data point is received 1000. A tree is selected 1004 from the already trained semi-supervised random decision forest. The leaves of the trees in the trained tree have associated clusters of training data and labels have been propagated to all these training data points using the transducer. The test data point is pushed 1006 through the tree until it reaches a leaf node and the cluster representation associated with that leaf during training is stored 1008. This is repeated 1010 for the other trees in the forest. The cluster representations are aggregated, for example by computing an average to obtain at least one cluster for the test data point. The test data point is then associated with a class label with a confidence.

Figure 6:
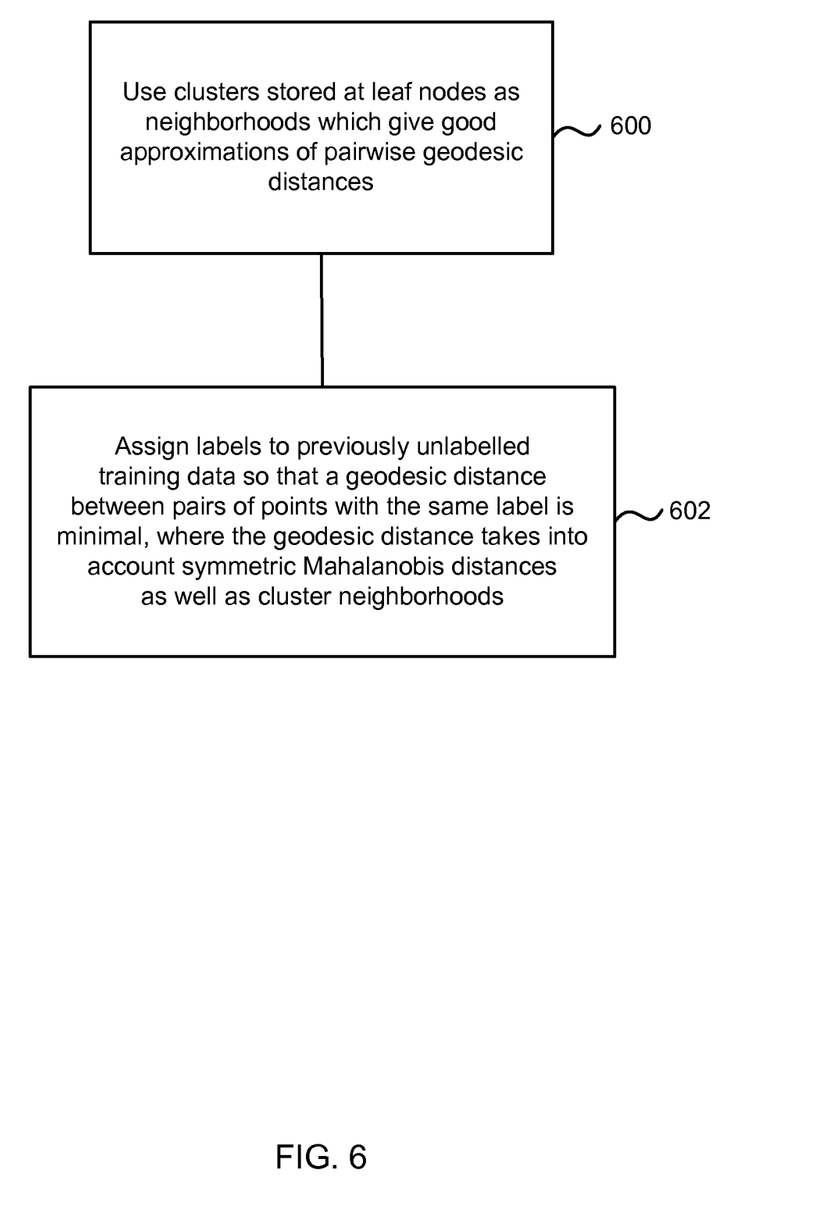
FIG. 6 is a flow diagram of a method at a transducer.

With reference to FIG. 6 an example of process at the transducer is described. Clusters stored at the leaf nodes of the trained semi-supervised random decision forest are used 600 as neighborhoods which give good approximations of pairwise geodesic distances. The inducer assigned 602 labels to previously unlabeled training data so that geodesic distances between pairs of points with the same label are minimal, where the geodesic distance takes into account symmetric Mahalanobis distances as well as cluster neighborhoods.

Figure 7:
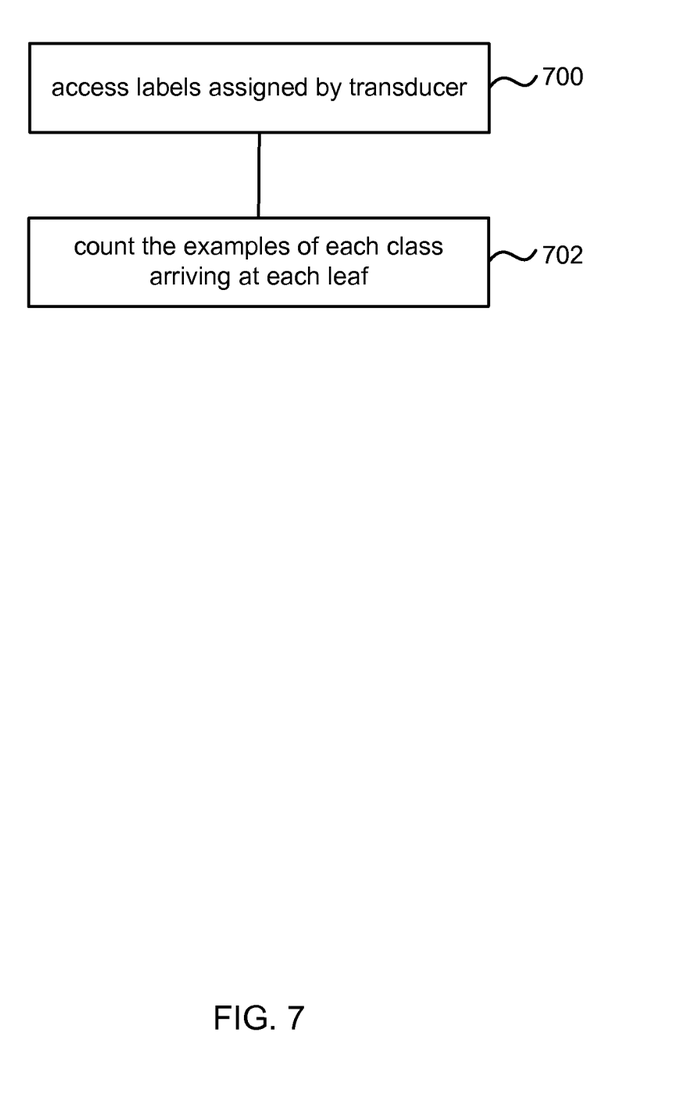
FIG. 7 is a flow diagram of a method at an inducer.

With reference to FIG. 7 an example of process at the inducer is described. Labels assigned by the transducer are accessed 700 and the inducer counts 702 the examples of each label/class arriving at each leaf. For a given tree this gives a tree posterior probability. The tree posterior probabilities are then aggregated to obtain a forest class posterior probability function.

Figure 8:
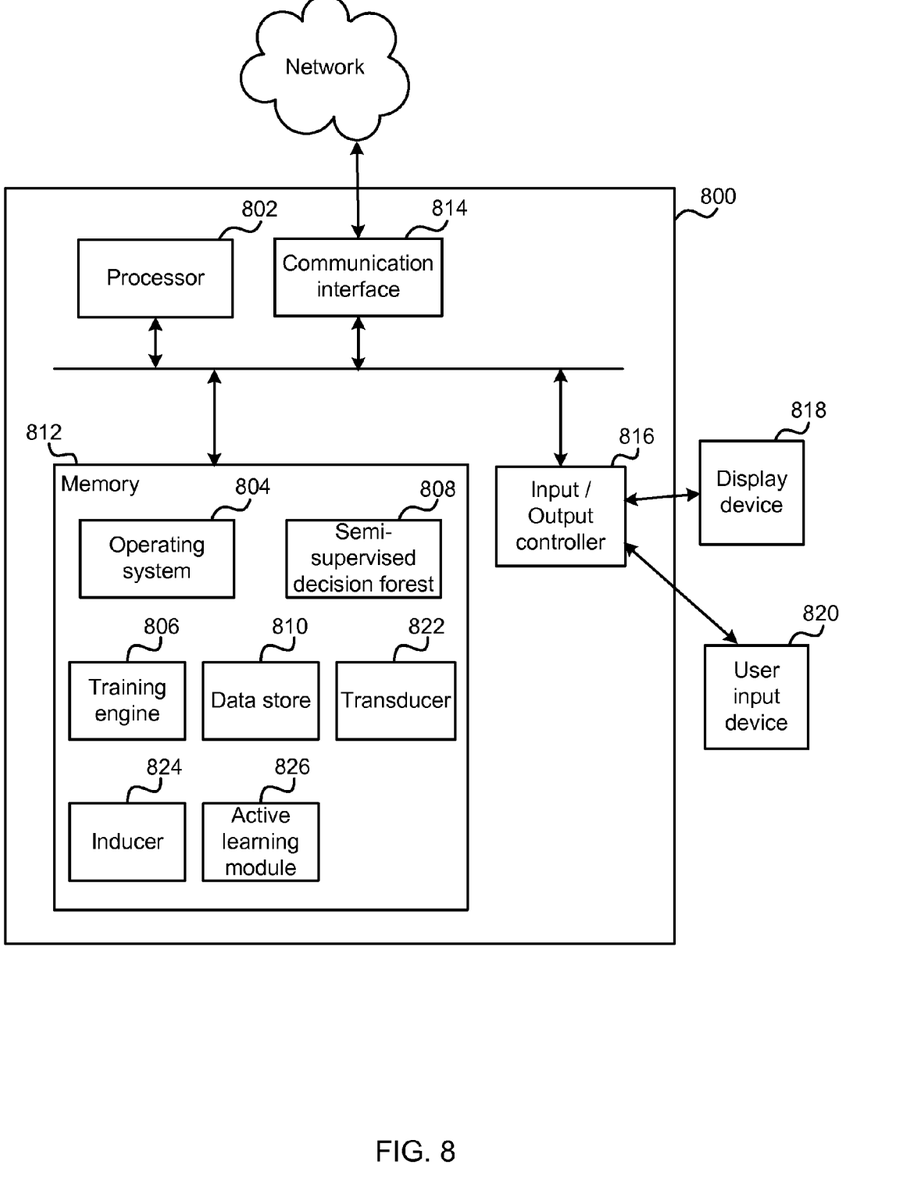
FIG. 8 illustrates an exemplary computing-based device in which embodiments of a machine learning system with a semi-supervised random decision forest may be implemented.

FIG. 8 illustrates various components of an exemplary computing-based device 800 which may be implemented as any form of a computing and/or electronic device, and in which embodiments of a machine learning system having a semi-supervised random decision forest may be implemented.

Computing-based device 800 comprises one or more processors 802 which may be microprocessors, controllers or any other suitable type of processors for processing computer executable instructions to control the operation of the device in order to train and use a semi-supervised random decision forest, for example, for image segmentation, medical image analysis and other applications. In some examples, for example where a system on a chip architecture is used, the processors 802 may include one or more fixed function blocks (also referred to as accelerators) which implement a part of the method of any of the methods described herein in hardware (rather than software or firmware). Platform software comprising an operating system 804 or any other suitable platform software may be provided at the computing-based device to enable application software to be executed on the device. A semi-supervised decision forest 808 may be stored at memory 812 and may be trained using training engine 806 as described herein with reference to FIG. 4. A data store 810 may be provided to store training parameters, training data, probability distributions and other information. A transducer 822 may be provided and optionally an inducer 824. An active learning module 826 may be provided to use information from the transducer and semi-supervised decision forest 808.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814).

The computing-based device 800 also comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface. This user input may be used to set parameters of the mixed information gain for training, to input training or test data, to access output of the inducer, transducer or random decision forest, or for other purposes. In an embodiment the display device 818 may also act as the user input device 820 if it is a touch sensitive display device. The input/output controller 816 may also output data to devices other than the display device, e.g. a locally connected printing device.

The input/output controller 816, display device 818 and optionally the user input device 820 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, red green blue camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A machine learning process comprising:
   accessing, using a processor, a plurality of labeled observations each labeled observation having a label indicating one of a plurality of classes that the labeled observation is a member of;
   accessing a plurality of unlabeled observations which are unlabeled in that, for each unlabeled observation, it is not known to which one of the plurality of classes the unlabeled observation belongs;
   training a plurality of random decision trees to form a semi-supervised random decision forest using both the labeled observations and the unlabeled observations such that each random decision tree partitions the labeled and the unlabeled observations into clusters according to similarity of the observations and according to the labels;
   assigning labels and certainties of those labels to the unlabeled observations by giving unlabeled observations the labels of close labeled observations where close labeled observations are selected on the basis of the clusters;
   identifying geodesic paths between the unlabeled observations and the close labeled observations, the paths being determined using at least one Mahalanobis distance;
   using the assigned labels and certainties to identify regions in a data space from which the unlabeled observations are drawn; and
   obtaining new observations in the identified regions and training the random decision forest using the new observations.

2. The method as claimed in claim 1 where each random decision tree is a hierarchical tree data structure comprising split nodes and leaf nodes and having a test associated with each split node.

3. The method as claimed in claim 1 wherein training the random decision trees comprises using a training objective which applies to unlabeled observations as well as to labeled observations.

4. The method as claimed in claim 1 wherein training the random decision trees comprises optimizing an information gain which comprises an unsupervised term and a supervised term.

5. The method as claimed in claim 1 wherein training the random decision trees comprises optimizing an information gain which comprises a supervised term and an unsupervised term, the supervised term comprising an entropy of the labeled observations that reach a specified split node minus the sum of an entropy of the labeled observations that reach each child node of the specified split node weighted by a ratio of the number of labeled observations that reach each of the child nodes of the specified split node to the number of labeled observations that reach the specified split node.

6. The method as claimed in claim 5 comprising calculating the entropy as the negative of the sum over possible ground truth label values of an empirical probability distribution extracted from the training points times the log of the empirical probability distribution.

7. The method as claimed in claim 1 comprising selecting the close labeled observations in a manner which optimizes geodesic distances between each unlabeled point and the labeled point it takes its label from.

8. The method as claimed in claim 7 wherein the geodesic distances are calculated on the basis of the clusters and using a distance measure based on correlations between variables which gauges similarity of an unknown sample set to a known one.

9. The method as claimed in claim 7 wherein the geodesic distances are calculated on the basis of the clusters and using a distance measure which discourages geodesic paths from cutting across regions of low data density.

10. The method as claimed in claim 1 comprising generating a clustering function by counting the labels for each class in each cluster.

11. The method as claimed in claim 1 comprising:
receiving an unseen, unlabeled observation and passing the observation through each of the trees in the forest to select a leaf of each tree;
aggregating the clusters of each of the selected leaves;
obtaining a label for the observation and a certainty of the label from the aggregated clusters.

12. A machine learning process comprising:
accessing, using a processor, a plurality of labeled observations each labeled observation having a label indicating one of a plurality of classes that the labeled observation is a member of, at least one of the plurality of labeled observations and the at least one label corresponding to the at least one of the plurality of labeled observations being machine generated;
accessing a plurality of unlabeled observations which are unlabeled in that, for each unlabeled observation, it is not known to which one of the plurality of classes the unlabeled observation belongs;
training a plurality of random decision trees to form a semi-supervised random decision forest using both the labeled observations and the unlabeled observations and according to a training objective which optimizes an information gain comprising an unsupervised term and a supervised term, training the plurality of random decision trees comprising:
assigning labels and certainties of those labels to the unlabeled observations by giving unlabeled observations the labels of close labeled observations where close labeled observations are selected on the basis of clusters of labeled and unlabeled observations generated by the plurality of random decision trees; and
identifying geodesic paths between the unlabeled observations and the close labeled observations, the paths being determined using at least one Mahalanobis distance.

13. The machine learning process as claimed in claim 12 wherein the labels assigned to the unlabeled observations are different for each of the plurality of random decision trees and the geodesic distance is used to exploit cross-tree clusters.

14. The machine learning process as claimed in claim 12 wherein the supervised term is a function comprising terms related at least to an entropy of the set of labeled observations that reach a given split node, an entropy of a set of labeled observations that reach a child of the given split node, and a ratio of a size of the set of labeled observations at the child node to a size of the set of labeled observations at the given split node.

15. The machine learning process as claimed in claim 14 wherein the entropy is a function comprising terms related at least to ground truth label values of an empirical probability distribution and a log of the ground truth label values of the empirical probability distribution.

16. The machine learning process as claimed in claim 12 wherein the unsupervised term is a function comprising terms related at least to the determinant of a covariance matrix of a Gaussian distribution computed for the set of unlabeled observations that have reached a given split node and a ratio of a size of a set of unlabeled observations at a child node of the given split node to a size of a set of unlabeled observations at the given split node.

17. A machine learning system comprising:
an input, the input comprising at least one processor, arranged to receive a plurality of labeled observations each labeled observation having a label indicating one of a plurality of classes that the labeled observation is a member of;
the input also arranged to access a plurality of unlabeled observations which are unlabeled in that, for each unlabeled observation, it is not known to which one of the plurality of classes the unlabeled observation belongs;
a training engine arranged to train a plurality of random decision trees to form a semi-supervised random decision forest using both the labeled observations and the unlabeled observations such that each random decision tree partitions the labeled and the unlabeled observations into clusters according to similarity of the observations and according to the labels;
a transducer arranged to assign labels and certainties of those labels to the unlabeled observations by giving unlabeled observations the labels of close labeled observations where close labeled observations are selected on the basis of the clusters;
the transducer being further arranged to discourage geodesic paths between labeled points and unlabeled points from cutting across regions of low data density using at least one Mahalanobis distance; and
an active learning module arranged to use the assigned labels and certainties to identify regions in a data space from which the observations are drawn and to train the semi-supervised random decision forest using new observations drawn from the identified regions.

18. The machine learning system as claimed in claim 17 wherein the training engine is at least partially implemented in hardware logic.

19. The machine learning system as claimed in claim 17 comprising an inducer arranged to generate a clustering function by counting the labels for each class in each cluster.

20. The machine learning system as claimed in claim 17 wherein the transducer is further arranged to assign labels to the unlabeled observations at least in part by minimizing a function comprising terms related at least to a set of all unlabeled observations.

* * * * *